INVENTOR.
HAROLD A. KEICHEL

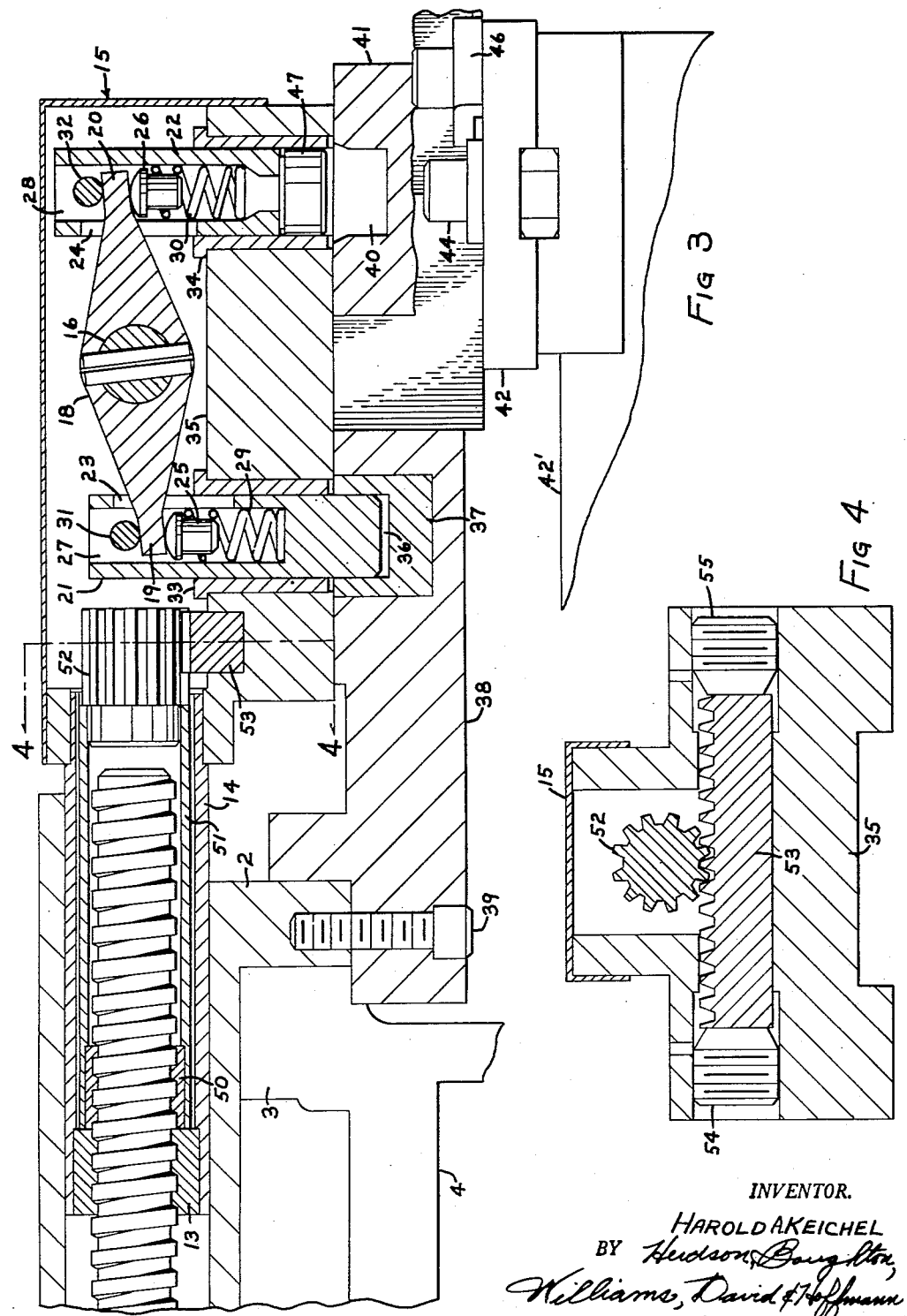
Feb. 4, 1964    H. A. KEICHEL    3,120,141
TAPER ATTACHMENTS FOR LATHES
Filed Dec. 27, 1960    3 Sheets-Sheet 2
INVENTOR.
HAROLD A KEICHEL
BY
ATTORNEYS Feb. 4, 1964            H. A. KEICHEL            3,120,141
TAPER ATTACHMENTS FOR LATHES
Filed Dec. 27, 1960            3 Sheets-Sheet 3
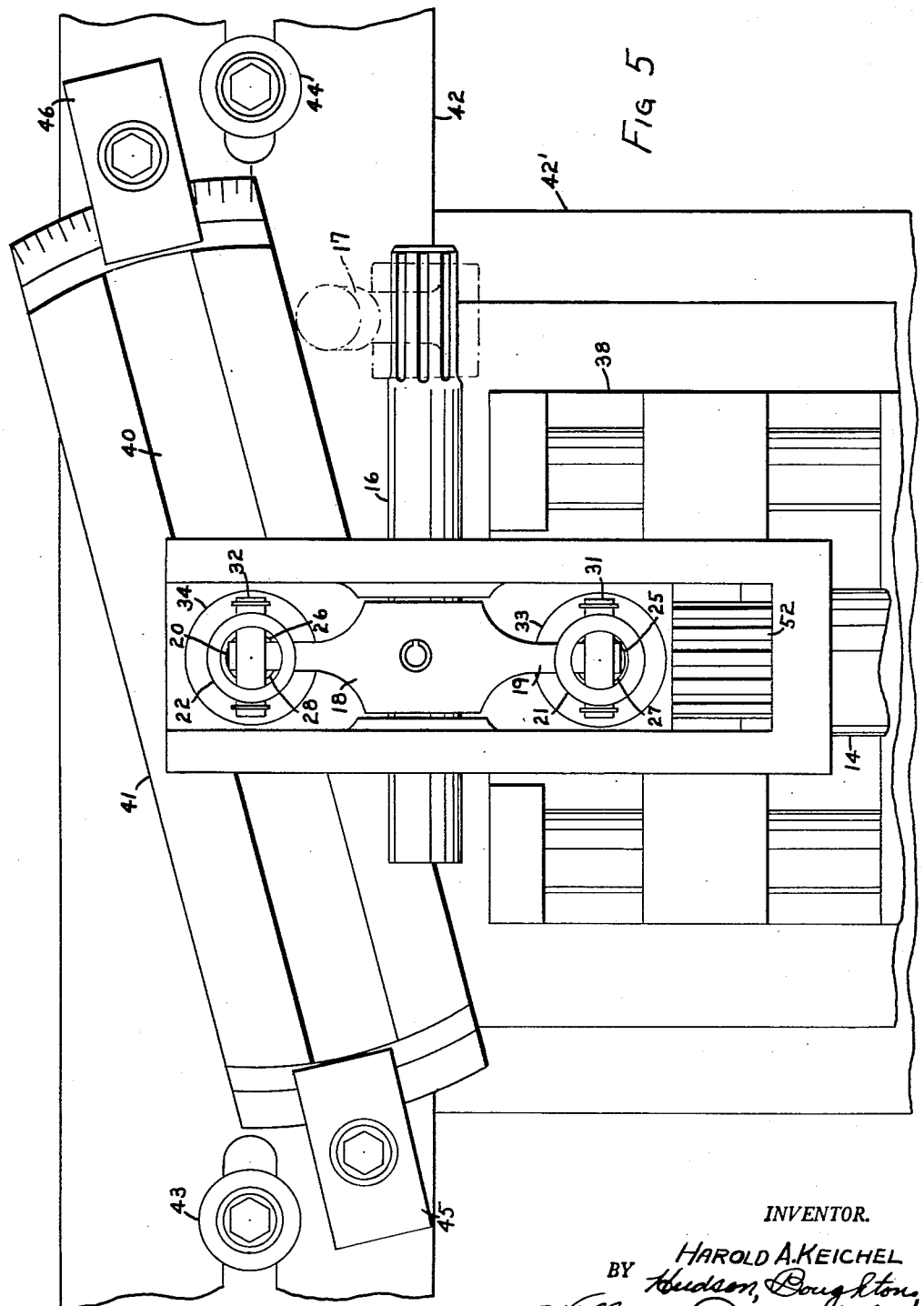
INVENTOR.
HAROLD A. KEICHEL
BY Hudson, Boughton,
Williams, David & Hoffmann
ATTORNEYS

United States Patent Office 3,120,141
Patented Feb. 4, 1964

3,120,141
TAPER ATTACHMENTS FOR LATHES
Harold A. Keichel, Euclid, Ohio, assignor to The Warner & Swasey Company, Cleveland, Ohio, a corporation of Ohio
Filed Dec. 27, 1960, Ser. No. 78,627
8 Claims. (Cl. 82—17)

This invention relates to taper attachments for lathes and has particular relation to an improved arrangement for converting between normal straight cylindrical turning and taper turning operations.

The invention is applicable to lathes of the type having a rotatable work-supporting spindle and a bed which mounts a carriage for movement in directions extending generally parallel to the spindle axis. The carriage is driven from a conventional drive operable from the spindle and the carriage mounts a tool-supporting slide for movement relative to the carriage in directions generally perpendicular to the spindle axis.

The slide is movable by rotation of a handwheel which effects relative rotation between cooperating screw and nut elements, one of which elements is attached to one of the slide and carriage for rotation with the handwheel and the other element being fixed against rotation. In the described and illustrated embodiment of the invention the screw is fixed to the handwheel and is rotatably mounted by the slide, and the nut is fixed against rotation and is movable longitudinally of the screw when the screw is held against rotation.

The present invention provides novel and improved means to connect the slide to a taper bar or cam to permit a taper turning operation wherein the tool effects a tapering cut of the workpiece, and to connect the slide to the carriage to permit a normal turning operation wherein the tool effects a straight cylindrical cut of the workpiece. During a taper turning operation the carriage is moved longitudinally of the spindle and the slide moves relative to the carriage transversely of the spindle as the slide follows the taper cam. During a normal turning operation the slide is disconnected from the taper cam and connected to the carriage so that the slide may be moved relative to the carriage only by rotation of the handwheel.

In the present invention the arrangement is such that the settings of the handwheel relative to dial markings are not disturbed during the conversions from normal to taper turning and back again from taper to normal turning. The handwheel settings are therefore repeatable which allows accurate duplication of work diameters. For this purpose the converting means is connected to the non-rotatable nut for movement therewith and is effective to connect the nut to the carriage for normal turning operation. The arrangement is such that when converting back to normal turning from taper turning the non-rotatable nut is operatively connected to the carriage so that the nut and carriage have the same relative positions as before the conversion to taper turning.

In the preferred embodiment of the invention the converting means includes a housing connected to the nut and containing a pair of plungers movable in opposing directions relative to a bushing of the carriage and relative to a slot of the taper cam respectively. The plungers are movable by actuatable means carried by the housing and which may be operator controlled. When a taper turning operation is desired, the actuatable means is actuated so that one of the plungers is moved to be positioned in the slot of the taper cam and the other plunger is moved out of engagement with the carriage bushing. When a normal turning operation is desired the actuatable means is actuated so that the other plunger is moved to engage the carriage bushing while the one plunger is moved out of the slot of the taper cam. With such arrangement the handwheel settings are repeatable and are not disturbed during the conversions so that rotation of the handwheel after the conversion back to normal turning to a setting which corresponds to the original setting prior to conversion to taper turning gives the same tool position as obtained by the original setting.

The invention also provides an improved arrangement for compensating for backlash between the rotatable screw and non-rotatable nut forming the cross slide drive. The means for accomplishing this includes a cooperating gear and rack with the gear being operatively connected to an additional nut which engages the non-rotatable nut. The rack is conveniently arranged for displacement to rotate the gear and the additional nut to effect the compensation.

It is therefore an object of the invention to provide a novel and improved arrangement in a lathe permitting rapid conversions between normal turning and taper turning operations.

It is another object of the invention to provide a lathe including a tool-supporting cross slide movable by rotation of a handwheel and improved means for converting between normal turning and taper turning operations without disturbing the settings of the handwheel during the conversions so that the handwheel settings are repeatable.

It is a further object of the invention to provide a lathe including a taper cam and a carriage movable longitudinally of a work-supporting spindle relative to the taper cam with a tool-supporting cross slide mounted by the carriage for movement relative thereto transversely of the spindle in response to rotation of one element of a pair of screw and nut elements relative to the other element, and means connected to the other element of the screw and nut elements for operatively connecting the cross slide to the taper cam to permit a taper turning operation, and for operatively connecting the carriage to the other element of said screw and nut elements to permit a normal turning operation.

It is still another object of the invention to provide an improved arrangement for compensating for backlash between screw and nut elements comprising a drive for a machine tool slide.

Other objects of the invention will become apparent from the following description taken in conjunction with the accompanying drawings in which similar reference characters designate corresponding parts and in which FIG. 1 is a view in end elevation with parts shown in section and with parts removed of a lathe incorporating the actuatable converting means of the present invention;

FIG. 3 is an enlarged fragmentary view with parts shown in section of the lathe illustrated in FIGS. 1 and 2;

FIG. 4 is a view taken along the line 4—4 of FIG. 3; and

FIG. 5 is an enlarged fragmentary view in to plan of the lathe illustrated in FIGS. 1 and 2.

Figure 1:
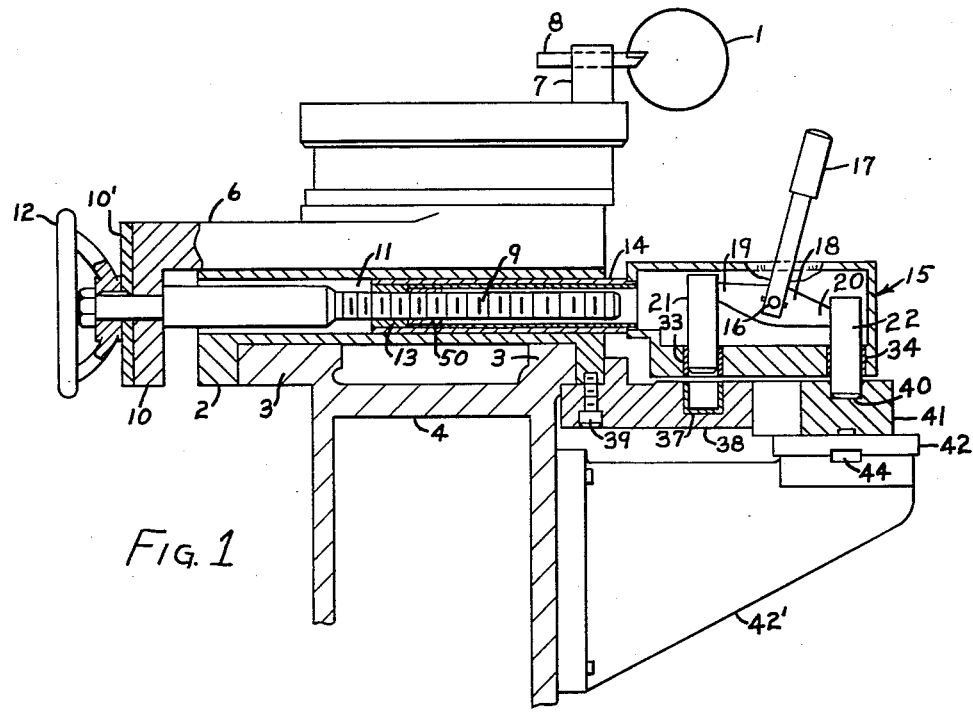

While the present invention is applicable to a variety of types of machine tools, it is particularly applicable to a lathe of the type having a rotatable work-supporting spindle with a carriage movable longitudinally of the spindle axis and mounting a tool-supporting cross slide for movement transversely of the spindle axis. In general, the present invention involves the provision of an improved arrangement for converting between a normal turning operation wherein the tool effects a straight cylindrical cut of the workpiece, and a taper turning operation wherein the tool effects a tapering cut of the workpiece.

Referring now to the drawings, there is illustrated in

FIG. 1 a lathe incorporating the teachings of the present invention. The lathe includes a rotatable spindle 1 adapted to support a workpiece (not shown) for rotation about an axis perpendicular to the paper as viewed in FIG. 1. The lathe includes a carriage 2 which is mounted by a pair of spaced ways 3 on a bed 4 for movement in directions parallel to the axis of the spindle 1. Movement of the carriage 2 is effected in the conventional manner by a drive mechanism (not shown) which operates from the spindle 1 to move the carriage at a speed proportional to the rotational speed of the spindle.

The carriage 2 supports a slide 6 for movement relative to the carriage in directions extending generally perpendicular to the spindle axis. The slide 6 supports a tool holder 7 to which is mounted a suitable tool 8 adapted to effect a machining operation on the workpiece supported by the spindle 1.

The slide 6 is moved relative to the carriage and relative to the spindle by drive means including a screw 9 which in the illustrated embodiment is rotatably supported by a depending portion 10 of the slide 6 located at the front of the lathe. The screw 9 extends into an opening 11 formed in the carriage 2 and is rotatable about a horizontal axis perpendicular to the spindle axis. A handwheel 12 is attached to the left-hand end of the screw 9 as viewed in FIG. 1 so that rotation of the handwheel in either direction effects a corresponding rotation of the screw 9. The screw threadably engages a nut 13 which is supported against rotation within a sleeve 14 located within the opening 11 of the carriage. The sleeve 14 is slidable within the opening 11 relative to the carriage in directions generally perpendicular to the spindle axis. It is understood that an arrangement may be employed wherein the nut is rotated and the screw is fixed against rotation.

The portion 10 mounts a dial plate 10' having angularly spaced markings thereon (not shown) each indicative of a separate position of the tool 8 so that when the handwheel 12 is set to a selected marking, the tool 8 will assume a certain position relative to the workpiece. As will presently appear, the converting means of the present invention is designed such that the handwheel settings are not disturbed during conversions between normal and taper turning.

Attached to the right-hand end of the bushing 14 is a housing desingated generally by the numeral 15 and which contains mechanism presently to be described for converting between normal turning and taper turning operations. The housing 15 is movable with the sleeve 14 and nut 13 in directions perpendicular to the spindle axis, as will presently be described. The mechanism for converting between normal and taper turning operations includes a shaft 16 which is rotatably supported by side walls of the housing 15 and the shaft 16 has fixed thereto externally of the housing an upwardly extending control rod 17. Also fixed to the shaft 16 within the housing is a lever 18 which rotates with the shaft and which has a pair of ends 19 and 20 on each side of the shaft 16 which are operatively connected to vertically extending plungers 21 and 22, respectively.

As best shown in FIG. 3, the ends 19 and 20 of the lever 18 project through elongated openings 23 and 24 of the plungers to engage the top surfaces of members 25 and 26 positioned within cavities 27 and 28 formed in the plungers. Coil springs 29 and 30 surround the members 25 and 26 and bear against bottom walls of the cavities 27 and 28. A pair of pins 31 and 32 are carried by the plungers and project transversely through the cavities 27 and 28 to engage the upper surfaces of the ends 19 and 20 of the member 18. The plungers 21 and 22 are slidable within a pair of bushings 33 and 34 mounted in openings formed in the bottom wall 35 of the housing 15. The mechanism just described is actuatable by movement of the rod 17 to effect the conversion between normal and taper turning. It is understood that the rod 17 may be actuated automatically in response to a preselected condition when a conversion is desired rather than manually as described.

Figure 2:
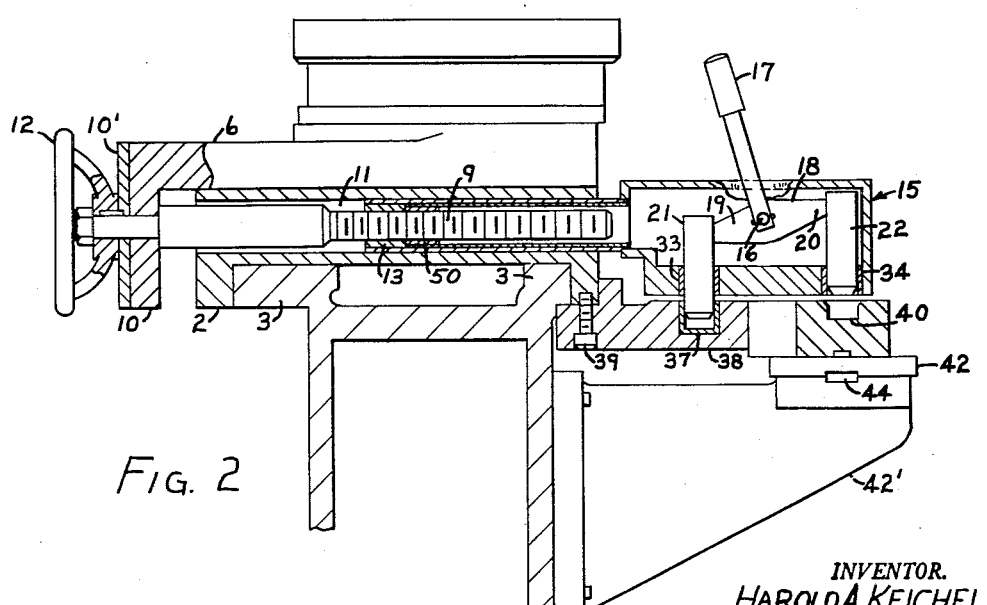
FIG. 2 is a view similar to FIG. 1 showing portions of the converting means in different positions from the positions thereof shown in FIG. 1.

The plunger 21 is movable in vertical directions in response to rotation of the shaft 16 into and out of a cavity 36 of a bushing 37 which is fitted in a cavity formed in a member 38 secured to the carriage 2 as by a screw 39. The member 38 is located beneath the housing 15 and the bottom wall 35 of the housing engages the upper surface of the member 38. In FIGS. 2 and 3 the plunger 21 is shown positioned within the cavity of the bushing 37 and for this condition the housing 15 and the nut 13 are locked against movement relative to the carriage.

The plunger 22 is adapted to cooperate with an elongated slot 40 formed in a taper bar or cam 41 which is attached to the bed 4 in any suitable manner. As best shown in FIGS. 3 and 5, the taper cam 41 is secured to a support 42 mounted on a base 42' secured to the bed. The support 42 is mounted on the base 42' by screw and nut assemblies 43 and 44 arranged to allow adjustment of the support 42 and cam 41 along the base 42'. The cam 41 is also adjustable with respect to the support 42 about a vertical axis so that varying degrees of tapers may be cut on the workpiece. The cam is clamped in an adjusted position by releasable clamps 45 and 46 attached to the support 42. The plunger 22 has affixed thereto a roller 47 rotatable about the axis of the plunger and adapted to fit within the slot 40 to engage the walls of the slot during movement of the carriage longitudinally of the spindle axis. In the illustrated embodiment the bottom wall 35 of the housing engages and is supported by the upper surface of the cam 41 which is observed to be level with the upper surface of the member 38. However, the bottom wall of the housing may be spaced from the upper surfaces of the cam 41 and the member 38 and can be supported for movement by other means.

When the plunger 21 is within the opening 36 of the bushing 37 the roller 47 is spaced from the slot 40 and the housing 15 and nut 13 are fixed against movement with respect to the carriage in directions perpendicular to the spindle axis. As a result, when the handwheel 12 and the screw 9 are rotated relative to the nut 13, the slide 6 will be moved relative to the carriage in a direction perpendicular to the spindle axis and the direction of such movement depends upon the direction of rotation of the handwheel. Such movement of the slide 6 serves to properly position the tool 8 with respect to the workpiece prior to a normal turning operation.

When the roller 47 is within the slot 40 the plunger 21 is spaced from the bushing 37 thereby freeing the housing 15, the nut 13, the screw 9 and the slide 6 for movement as a unit relative to the carriage in directions perpendicular to the spindle axis. Accordingly, when the carriage is moved longitudinally of the spindle, the cross slide 6 will be moved transversely of the spindle relative to the carriage by a distance dependent upon the angular position of the cam 41. Such movement of the cross slide is effected by movement of the housing 15 transversely of the spindle in response to longitudinal movement of the carriage and movement of the roller 47 along the slot 40. This movement of the housing operates to move as a unit in the transverse direction the sleeve 14 attached to the housing, the nut 13 attached to sleeve 14, the screw 9 threaded in the nut 13 and the slide 6 which carries the screw.

The plungers 21 and 22 are shown in FIGS. 1–3 and 5 as positioned in vertical alignment with the bushing 37 and the slot 40 respectively. Such alignment occurs only when the carriage is at a selected position with respect to the cam 41, and in FIG. 5 such carriage position is shown as being approximately intermediate the longitudinal extent of the cam 41.

Operation of the mechanism may now be described. Let it be assumed that a normal turning operation has just been completed and that it is desired to perform a taper turning operation upon the workpiece. The cam 41 is adjusted to a longitudinal and angular position effective to give the desired taper, and the carriage is then moved to place the tool 8 at the desired position. The cross slide 6 is next locked against movement relative to the carriage in any suitable manner so as to prevent axial movement of the screw 9 and movement of the slide and the tool transversely of the workpiece in response to rotation of the handwheel 12.

The rod 17 is now actuated from its position shown in FIG. 2 toward the right as viewed in FIG. 2. This movement of the rod 17 operates to rotate the shaft 16 in a clockwise direction and to lift the plunger 21 out of the cavity 36 of the bushing 37 whereby the cross slide 6 is freed from the carriage 2 for movement relative to the carriage transversely of the spindle axis in response to movement of the roller 47 along the slot 40. Such movement of the rod 17 also lowers the plunger 22 and if the roller is vertically aligned with the slot 40, the roller will enter the slot 40 to operatively connect the slide 6 to the cam 41. However, if the roller is not aligned with the slot, the bottom surface of the roller 47 will engage the upper surface of the cam 41 whereby the member 26 will be depressed against the action of the spring 30. The handwheel 12 is now rotated and since the slide 6 is locked against movement relative to the carriage in response to rotation of the handwheel, the nut 13 is moved longitudinally of the screw 9 whereby the housing 15 and the roller 47 are moved in a transverse direction relative to the carriage. When the roller 47 is moved to a position wherein it is vertically aligned with the slot 40, the roller will be forced into the slot by expansion of the spring 30 whereby the cross slide 6 is operatively connected to the cam 41.

The rod 17 is held in the above-described position and the slide 6 is unlocked from the carriage. The carriage is now moved longitudinally of the spindle in the desired direction to effect the taper turning operation. During such movement of the carriage the roller 47 will move along the slot 40 which imparts a transverse movement of the slide 6 relative to the carriage and relative to the workpiece to effect the tapering cut. When the taper turning operation is completed and if it is desired to return to a normal turning operation the above described operations are reversed.

To effect the conversion the cross slide is again locked against movement transversely of the spindle relative to the carriage and the rod 17 is actuated from the position shown in FIG. 1 toward the left which operates to withdraw the roller 47 from the slot 40. If the plunger 21 is not vertically aligned with the bushing 37 at this time, such movement of the rod 17 causes the bottom surface of the plunger 21 to engage the upper surface of the member 38. The handwheel is then rotated until the plunger 21 is moved to a position wherein it is in vertical alignment with the cavity 36 of bushing 37, at which time the plunger 21 will be forced into the cavity 36 in response to expansion of the spring 29. This locks the housing 15 and the nut 13 to the carriage and the lathe is now prepared for a normal turning operation.

It is noted that although rotation of the handwheel 12 during the conversions from normal to taper turning and from taper to normal turning causes the tool 8 to be out of reference with the handwheel settings, the handwheel settings as indicated by the markings on the plate 10' are not disturbed inasmuch as the nut 13 is always returned to its original position relative to the carriage. As a result, if the handwheel is rotated after the conversion from taper turning to normal turning to the same original setting thereof prior to the conversion from normal to taper turning, the tool 8 will be in a position identical to its original position. This is for the reason that the bushing 37 provides in effect a fixed reference for normal turning to which the nut 13 is returned after the taper turning operation.

During the conversion from normal to taper turning or from taper to normal turning it is not necessary to lock the slide 6 against movement relative to the carriage in order to permit movement of one of the plungers into vertical alignment with the associated bushing 37 or slot 40 as described. Instead, this may be accomplished by the operator grasping the slide 6 and pulling or pushing which will result in movement of the slide 6, screw 9, nut 13 and housing 15 as a unit relative to the carriage and the cam. Instead of grasping the slide, the operator may accomplish the same result by applying force to the rod 17 in the proper direction.

The present invention also provides an arrangement to compensate for backlash between the screw 9 and nut 13. As best shown in FIGS. 3 and 4, a nut 50 is in threaded engagement with the screw 9 and is secured to a sleeve 51 within the hollow of the sleeve 14. The sleeve 51 has attached to its right-hand end a gear 52 which projects into the housing 15 in meshing relation with a rack 53 slidably mounted by the bottom wall 35 of the housing. A pair of screws 54 and 55 are positioned within openings of the housing and are threadably engaged with such openings for adjustment towards and away from the rack 53. The screws engage opposing ends of the rack and the position of the rack with respect to the gear 52 may be adjusted by rotating the screws 54 and 55 in any suitable manner such as by a suitable tool. When the rack is so adjusted the gear 52 is rotated and accordingly the sleeve 51 and the nut 50 are rotated so that the nut 50 may be forced into tight engagement with the nut 13. The nut 50 is held against rotation by the screws 54 and 55 which are positioned to hold the rack against displacement from its adjusted position.

Although the invention has been described with reference to certain specific embodiments thereof, numerous modifications are possible and it is desired to cover all modifications falling within the spirit and scope of the appended claims.

I claim as my invention:

1. In a machine tool, a bed, a carriage movable on said bed along a rectilinear path, a cross slide on said carriage movable along a second path transversely of said rectilinear path, a taper cam on said bed having a cam surface for moving said cross slide along said second path as said carriage moves along said rectilinear path, a cam follower movable to and from engagement with said cam, relatively rotatable cooperating first and second elements interconnecting said carriage and cross slide and relatively rotatable to move said cross slide along said second path, one of said elements being a lead screw extending parallel to said second path and the other being a cooperating nut, means connecting said first element to said cross slide and restraining the element against axial translation relative to the cross slide, means supporting said second element on said carriage for movement parallel to said second path, means for restraining said second element against axial translatory movement relative to said carriage comprising a movable locking plunger translatable with said second element and having a non-locking position and being movable relative to said second element when said second element is in a predetermined position relative to said carriage to a locking position in engagement with said carriage to hold said second element against translatory movement relative to said carriage, a member movable in first and second opposite directions between first and second positions, a connection connecting said plunger to said member to move said plunger from its locking to its non-locking position upon movement of said member from its said first position to its said second position and providing for relative lost motion movement between said member and locking plunger when said member is moved from its said second position to its said first position with said plunger in its non-locking position, a bias acting on said plunger to urge said plunger into its locking position, and a connection connecting said member to said cam follower to move said cam follower out of engagement with said cam when said member is moved to its said first position and to engage said cam when said member is moved to its said second position.

2. A machine tool as defined in claim 1 including a handwheel secured to said elements for rotating said one of said elements relative to said other of said elements, said predetermined position establishing a fixed relationship between a handwheel setting and the tool position resulting therefrom.

3. A machine tool as defined in claim 1 wherein said screw is rotatably mounted by said slide and said nut is fixed against rotation.

4. A machine tool as defined in claim 1 including backlash compensating means comprising an additional nut in threaded engagement with said screw and rotatable relative to said first-named nut, a gear operatively connected to said additional nut, a rack in meshing engagement with said gear, and means for adjusting said rack for rotating said gear and said additional nut relative to said first-named nut and for holding said rack in its adjusted position for preventing rotation of said additional nut.

5. In a machine tool, a bed, a carriage movable on said bed along a rectilinear path, a cross slide on said carriage movable along a second path transversely of said rectilinear path, a taper cam on said bed having a cam surface for moving said cross slide along said second path as said carriage moves along said rectilinear path, a cam follower movable to and from engagement with said cam, a lead screw extending parallel to said second path and rotatably supported by said cross slide, a nut in threaded engagement with said screw and fixed against rotation, means connecting said lead screw to said cross slide and restraining the lead screw against axial translation relative to the cross slide, means supporting said nut on said carriage for movement parallel to said second path, means for restraining said nut against axial translatory movement relative to said carriage comprising a movable locking plunger translatable with said nut and having a non-locking position and being movable relative to said nut when said nut is in a predetermined position relative to said carriage to a locking position in engagement with said carriage to hold said nut against translatory movement relative to said carriage, a member movable in first and second opposite directions between first and second positions, a connection connecting said plunger to said member to move said plunger from its locking to its non-locking position upon movement of said member from its said first position to its said second position and providing for relative lost motion movement between said member and locking plunger when said member is moved from its said second position to its said first position with said plunger in its non-locking position, said plunger being biased to locking position when the member is in its said first position and said plunger is in its non-locking position, and a connection connecting said member to said cam follower to move said cam follower out of engagement with said cam when said member is moved to its said first position and to engage said cam when said member is moved to its said second position.

6. In a machine tool, a bed, a carriage movable on said bed along a rectilinear path, a cross slide on said carriage movable along a second path transversely of said rectilinear path, a taper cam on said bed having a cam surface for moving said cross slide along said second path as said carriage moves along said rectilinear path, a cam follower movable to and from engagement with said cam, relatively rotatable cooperating first and second elements interconnecting said carriage and cross slide and relatively rotatable to move said cross slide along said second path, one of said elements being a lead screw extending parallel to said second path and the other being a cooperating nut, means connecting said first element to said cross slide and restraining the element against axial translation relative to the cross slide, means supporting said second element on said carriage for movement parallel to said second path, means for restraining said second element against axial translatory movement relative to said carriage comprising a movable locking plunger translatable with said second element and having a non-locking position and being movable relative to said second element when said second element is in a predetermined position relative to said carriage to a locking position in engagement with said carriage to hold said second element against translatory movement relative to said carriage, a member movable in first and second opposite directions between first and second positions, a resiliently yieldable force-transmitting connection connecting said member to said plunger to move said plunger into and out of said locking position when said member is moved in said first and second opposite directions respectively and yieldable when said plunger is held and said member is moved in its said first direction, and a connection connecting said member to said cam follower to move said cam follower out of engagement with said cam when said member is moved in said first direction and to engage said cam when said member is moved in said second direction.

7. A machine tool as defined in claim 6 wherein said screw is rotatably mounted by said slide and said nut is fixed against rotation.

8. A machine tool as defined in claim 6 including backlash compensating means comprising an additional nut in threaded engagement with the screw and rotatable relative to the first-named nut, a gear operatively connected to said additional nut, and means for rotating said gear to rotate said additional nut relative to said first-named nut.

References Cited in the file of this patent
UNITED STATES PATENTS

| | | |
|---|---|---|
| 46,152 | Slate | Jan. 31, 1865 |
| 959,810 | Shampou et al. | May 31, 1910 |
| 2,211,723 | Groene et al. | Aug. 13, 1940 |
| 2,269,390 | Whitehead | Jan. 6, 1942 |